Figure 1:
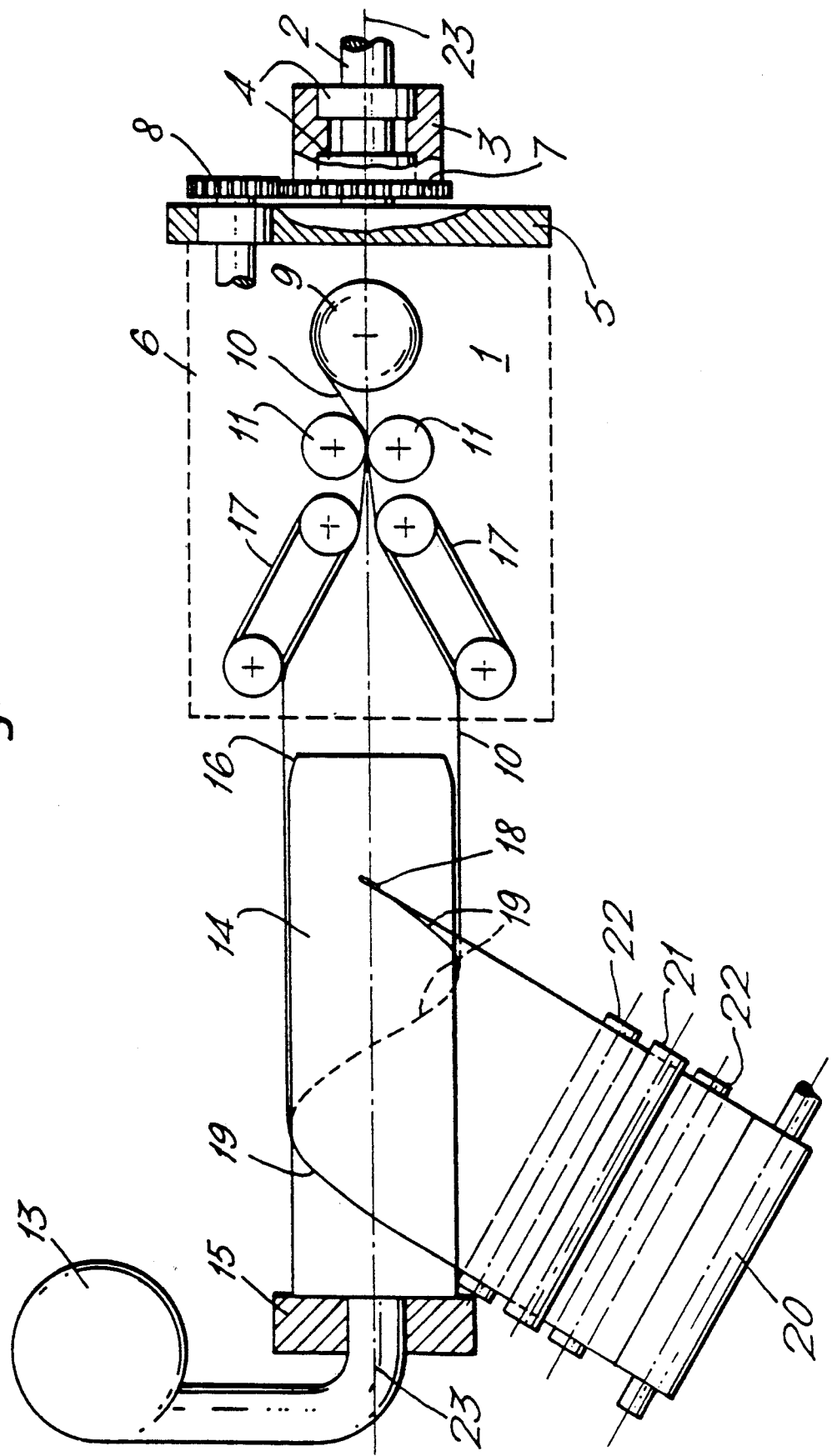

United States Patent [19]
Rasmussen

[11] Patent Number: 5,248,366
[45] Date of Patent: Sep. 28, 1993

[54] METHOD FOR HELICAL CUTTING OF A FLEXIBLE TUBULAR SHEET OF POLYMERIC MATERIAL

[76] Inventor: Ole-Bendt Rasmussen, 23, Forchwaldstrasse, Walchwil, Switzerland, CH 6318

[21] Appl. No.: 623,990
[22] PCT Filed: Jun. 26, 1989
[86] PCT No.: PCT/GB89/00712
   § 371 Date: Jan. 11, 1991
   § 102(e) Date: Jan. 11, 1991
[87] PCT Pub. No.: WO89/12533
   PCT Pub. Date: Dec. 28, 1989

[30] Foreign Application Priority Data
Jun. 24, 1988 [GB] United Kingdom ............... 815083

[51] Int. Cl.⁵ ............................................. B32B 31/00
[52] U.S. Cl. .................................. 156/259; 156/193; 156/229; 156/426; 82/47; 82/102; 83/180; 83/403; 83/404.1; 29/2.1; 29/2.18; 29/2.2; 29/2.23; 264/46.1; 264/46.2; 264/46.3; 264/45.9
[58] Field of Search .............. 156/259, 426, 193; 29/2.1, 2.14, 2.15, 2.16, 2.17, 2.18, 2.2, 2.21, 2.24, 2.25, 2.11, 2.23; 83/180, 403, 404.1; 264/159, 46.1, 46.2, 46.3, 45.9; 82/102, 47

[56] References Cited
U.S. PATENT DOCUMENTS

| | | | |
|---|---|---|---|
| 1,787,208 | 12/1930 | Morris | 29/2.2 |
| 2,644,522 | 7/1953 | Parker et al. | 29/2.14 |
| 3,804,931 | 4/1974 | Miller | 264/46.3 |
| 3,879,505 | 4/1975 | Boutillier et al. | 264/46.1 |
| 4,661,301 | 4/1987 | Okada et al. | 264/46.2 |
| 4,783,287 | 11/1988 | Eichberger et al. | 264/46.2 |
| 4,809,413 | 3/1989 | Upmeier | 29/2.18 |
| 4,960,549 | 10/1990 | Brooks et al. | 264/46.1 |

FOREIGN PATENT DOCUMENTS
816607 10/1955 United Kingdom .

Primary Examiner—David A. Simmons
Assistant Examiner—Merrick Dixon
Attorney, Agent, or Firm—William J. Daniel

[57] ABSTRACT

Flexible tubular film is helically cut into a flat strip by feeding the tubular film in flattened form from a supply source to a film feeding means advancing the flat film tube at a predetermined velocity to a tube expansion zone in which the flat tube is expanded into a generally cylindrical tube and passed axially over a hollow mandrel slightly less in external diameter than the diameter of the expanded tube to be cut helically while on the mandrel into a flat strop that is removed at an angle to the mandrel axis. The tube is expanded in the zone by inflation with air fed through the mandrel in a direction countercurrent to the direction of tube movement and under a pressure sufficient to render the expanded tube stiff as it slides over the mandrel and resistant to deformation while being helically cut. The advance and expansion of the flat tube in the expansion zone is positively controlled by moving surfaces contacting the film, which surfaces define a diverging expansion zone and are driven at a velocity substantially at least as great as the predetermined velocity of advance of the flat film tube to the expansion zone.

15 Claims, 3 Drawing Sheets

METHOD FOR HELICAL CUTTING OF A FLEXIBLE TUBULAR SHEET OF POLYMERIC MATERIAL

Helical cutting of a flexible tubular sheet or film of polymeric material is disclosed in GB 816,607. The object in that patent was to manufacture bands having a strong molecular, oblique, orientation. The bands are mainly used for manufacture of high strength cross laminates of uniaxially oriented plies. In order to achieve the desired properties, the tubular film is strongly oriented in its original longitudinal direction prior to the helical cutting, which is generally conducted over a mandrel. The tube is forwarded either with a screw movement before cutting with a fixed knife, or with a linear movement before cutting with a rotating knife, in which event the winder for taking up the helically cut film must rotate with the knife in a planetary type of movement.

Helical cutting of flexible tubular film is also used in GB 1,526,722. The tube that is to be cut generally has a uniaxial polymer grain, this being produced during the extrusion. However the extrusion need not, prior to the helical cutting, provide any significant orientation of the film below its melting point. The object again is the manufacture of high strength cross laminates but in this case the plies are biaxially oriented by stretching after or during the lamination, the transverse and longitudinal stretching processes being mutually independent steps and each step generally being uniaxial.

These patents do not disclose means for synchronising the different movements that control the helical cutting, i.e., the advancement of the film, the rotation of the film or the cutter, and the withdrawing of the cut film. However some degree of such synchronisation can be developed using conventional engineering techniques.

Nevertheless certain problems do remain.

One problem is that the take-off of the cut strip is at an angle to the original direction of advance of the film and therefore tends to produce torque forces in the tubular sheet. This tends to result in distortion of the tube at the time of cutting, and thus distorts the cut and the resultant cut strip. It is very difficult to balance the forces so as to avoid this distortion.

Another problem is that it can be difficult to achieve a regular and accurate supply of film towards the cutting station, particularly when the film is provided in flat form wound on a very heavy reel.

As is well known, there are many instances when it is desirable to provide films of sheet material which is oriented under an angle to the longitudinal direction and, as indicated above, the known processes of helical cutting can be used to this end. However it is desirable to provide a more technically feasible and reliable process, that is also suitable for heavy or wide reels and for high production speeds.

Objects of the invention are to overcome these various problems and to provide methods and apparatus for improved helical cutting of films, and to provide improved films.

According to a first aspect of the invention, a flexible tubular sheet or film of polymeric material is supplied to a first position in a flat form and is helically cut to form a cut strip that is drawn away from the tubular sheet, and the method is characterised in that the sheet is drawn from the first position, opened to a tubular form, drawn over a mandrel and helically cut while passing over the mandrel, and in this process the tubular sheet is inflated by air that is continuously supplied through the mandrel towards the first position to form a stiff tube that makes a sliding fit with the mandrel and that resists deformation during the cutting.

Thus, in the invention air is forced from the mandrel into the tubular film as it travels from its flat state to the mandrel and thereby inflates the film to a tube. The mandrel must have a diameter only very slightly smaller than the tube, in order to allow an adequate pressure to exist within the tube to render it sufficiently stiff. However some air inevitably escapes between the tube and the mandrel and this escaping air can provide lubrication between the tube and the mandrel.

As a result of the tube being stiff as it slides over the mandrel towards the position at which it is helically cut, distortion of the tube by the cutting and the drawing of the cut strip can be greatly reduced. The degree of stiffness that is required for any particular film will depend upon the material being used and the process conditions. However it is easy to choose the air pressure within the tube, and thus the stiffness of the tube, to obtain whatever degree of resistance to deformation that is optimum for the particular process. Thus, in the invention, it is possible to apply much higher forces during the pull-off of the helical cut strip from the mandrel and the winding of this cut strip.

The pressure within the tube, and the supply of air through the mandrel, will be selected according to the materials being used. For instance relatively low pressures should be used when the film is liable to split, for instance when the film is of low gauge, high degree of uniaxial orientation, and/or high stiffness. However if the pressure is too low relative to the oblique pulling forces, then the tubular sheet will lose its stiffness and will become twisted and the process will become less accurate or may terminate. Provided the film permits it, it is generally desirable for the air pressure to be sufficient to allow a tension of at least 200 g per meter width in the sheet at the pull-off from the mandrel and, provided the sheet permits it, A preferably the tension is at least 2 kg per meter.

The advantages of the invention are achieved mainly when the flat tube has a width of at least 20 cm. The width can be up to 200 cm or even higher.

The cutting angle is generally at least 2020. Values of up to 70° can be achieved relatively easily with good accuracy, but it is also possible to achieve values approaching 90°.

Preferably the diameter of the mandrel is variable or adjustable. For instance it can be made from a tubular rubber sheet held by a circular array of ribs which are supported by extendable means (for instance in the same manner as the support ribs of an umbrella). Adjustment of these extendable means will thus result in adjustment of the effective diameter of the mandrel and so the same mandrel can be used for different widths of tube. The diameter can also be varied to control the air pressure. This is of particular value when cutting fragile sheets, such as thin, rigid and/or highly oriented sheets, when minimisation of the air pressure and air flow is important. In this situation the variable diameter of the mandrel can be feed-back controlled by monitoring the rate of the air flow or the overpressure inside the tube.

The surface of the mandrel can be corrugated to minimise the friction between the sheet and the mandrel. These corrugations can conveniently consist of generally longitudinally ribs. The corrugations promote the flow of air over the entire circumference of the mandrel and therefore improve the lubrication effect of the annular air flow between the film and the mandrel.

The helical cutting can be arranged in line with the initial extrusion of the flexible tubular sheet, but the machinery for this combination will tend to be rather complicated and will generally only operate at relatively low rates of production. It is therefore preferred first to extrude the tubular sheet and then to wind this in flat form on a reel. This reel is then mounted in an unwind device and this simultaneously causes the tubular sheet to unwind in flat form and to rotate around its centre axis. The location of cutting should then be fixed in relation to the room and the film moves linearly after the cutting. This is more convenient than providing for the film to move linearly and for the knife to rotate around the mandrel, together with the winding machinery.

In a simple form of apparatus for providing that the flat film at the first position is rotating, the axis of the reel is mounted perpendicular to the axis of rotation of the tube with the middle point of the reel on or near to the last mentioned axis. Such an arrangement is illustrated in FIG. 1 of the accompanying drawings. This method is very satisfactory for spiral cutting of reels that are not too heavy (e.g., up to about 400 kg) provided the reel is of proper shape and tightness and has its centre of gravity properly on the axis of rotation and provided the velocity of rotation is not too high. However the method is less satisfactory if the reel is very heavy, is rotated very fast, or has imperfect shape or tightness. These problems exist also even when there is no air flow through the mandrel. A new system of supplying the flat film is provided that overcomes these problems.

Thus according to another aspect of the invention (that need not be combined with the inflation of the tubular sheet by air through the mandrel) the location of cutting is fixed (i.e., it is fixed relative to the room in which the process is conducted), the sheet is provided at the first position from a reel and is discharged from the reel at a discharge zone and is drawn to the mandrel with a screw movement, and the sheet is drawn from the reel substantially along the axial direction of the reel while the discharge zone spins around the reel to produce rotation of the tube (relative to the room). Preferably the reel has substantially the same axis as the axis of rotation of the tube and the tubular sheet is guided and maintained in flat form from unwind to the discharge zone and transformation to the tubular form begins at that zone, whereby the middle line of the flat sheet is guided to become substantially coincident with the axis of the reel.

This technique minimises the problem of mechanical forces on the rotating unwind, and reduces the need for exact adjustment of the position of the reel in the unwinder. It also minimises the risk of telescoping during the unwind of film that is wound too loosely on the reel. Thus it permits the use of much heavier reels and much higher velocities.

The bearing or bearings around which the unwind unit rotates can be located at one end only of the unit, namely at the end opposite to the cutting as shown in FIG. 1. However when heavy weights are involved this system is vulnerable to fatigue breakage unless the shaft, bearings and support for the latter are of particularly heavy construction.

Another aspect of the invention (that can again be operated in combination with or without the air inflation and with or without the defined mounting of the reel) provides a solution to this problem. In particular, the location of cutting is fixed (relative to the room), the sheet is provided on a reel mounted in an unwind unit and is drawn to the mandrel from the reel with a screw movement that is provided by rotation of the unwind unit, and the unwind unit is mounted on a bearing that comprises a bearing ring that surrounds the tubular sheet.

The processes of the invention are normally intended to manufacture cross laminates having high strength, and for this purpose two or more helically cut films are subsequently laminated with one another with the original longitudinal directions of the tubular sheet crisscrossing each other. Preferably therefore the tubular sheet is given a uniaxial melt orientation. Alternatively or in combination therewith the tubular sheet may be longitudinally oriented below the melting range of the polymer material.

As geometrical conditions show, the following equation relates the width (h) of the flat tube, the cutting angle (v) measured between the longitudinal direction of the flat tube and the direction of cutting and the final width (w) namely $$w = 2h \cos v$$

As examples, with a cutting angle 60° the final width would equal the flat width, at 45° the flat width will be increased by $\sqrt{2}$ (1.41) and with cutting angle 30° by $\sqrt{3}$ (1.73). With cutting angles higher than 60°, the obtainable width for a given spiral cutting machine will rapidly decrease.

Another aspect of the invention has the purpose of increasing the obtainable final width for a given final angle of melt orientation and for a given spiral cutting machine, especially in the case of angles about 60° or closer to 90°. Although this aspect is preferably used in combination with the air inflation and optionally one or more of the other aspects of the invention, it can again be used independently of those.

In this aspect of the invention, the tubular sheet material was initially manufactured by extrusion through an extrusion die with spiral melt orientation by draw-down in molten to semi-molten state and simultaneous relative rotation between take-off means and at least the exit of the extrusion die, and the spiral cutting is carried out in such a direction that the angle of orientation is increased relative to the length direction of the cut strip.

In theory it could be assumed that the spiral cutting could be omitted (except when an angle of 90° is desired) if the relative rotation was fast enough. In practice however difficulties in carrying out such extrusion increase with the increased angle of orientation and it has been found that an increased angle inherently leads to an increased component of biaxially melt oriented material, and this is generally not desirable at least in the production of cross laminates. For instance it is not usually feasible to produce angles higher than about 30° by such relative rotations in connection with the take-off from the extrusion die.

Thus this aspect of the invention permits, in an easy practical manner, a substantial increase in the angle relative to the length direction of the cut strip. e.g., the 30° angle from the extrusion can be made a 60° angle by cutting under 30° or it can be made perpendicular by cutting under 60°. In the first mentioned case the flat width is increased by a ratio of 1.73:1 and in the second case it is the same before and after the spiral cutting.

The strip that is obtained in all the aspects of the invention can be relatively wide, typically 50 cm or higher, and so for the first time the invention provides the provision of a strip of 50 cm or greater width and which has an angle of melt orientation of 70° up to perpendicular. This material forms a further aspect of the invention. Preferably, but not essentially, it is made using the air inflation technique described above. This material gives important advantages and yet its production is, as a result of the invention, relatively easy without use of a tenter frame or similar apparatus. in particular, it is now relatively easy to produce substantially perpendicularly oriented sheet material of, for instance, 3 m width even on reels of several tons (especially when the second aspect of the invention is used, preferably in combination with the third aspect).

Extruded sheet material will normally exhibit a crain showing the direction of take-off from the extrusion die and the novel sheet material according to the invention is characterised in that the width is at least 50 cm, the angle between the grain which shows the direction of take-off from the extrusion die and the longitudinal direction of the sheet, is from 70° up to perpendicular.

This novel sheet material can be used for, for example, the production of a novel type of biaxially oriented film in which at least the major proportion of the transverse orientation is produced at take-off from the extrusion dye and the longitudinal orientation is produced at a much lower temperature. The longitudinal orientation and optional additional transverse orientation of relatively low temperature can with advantage be carried out by the method described in WO88/05378.

The various aspects of the invention are of particular value for the manufacture of a cross laminate of plies which have a generally uniaxial grain from the extrusion and in which the grain from different plies is in cross laminated relationship, but which subsequently has been biaxially oriented. Such cross laminates are described in GB 1,526,722. When making such cross laminates, it is desirable to produce one or more plies having a grain from the extrusion forming an angle of from 70° to 90° to the longitudinal direction, especially in combination with one or more plies having a grain of 0° or close to this.

It has been found that cross laminates of this type and with these angles (especially about 90° combined with about 0°) show maximum tear strength in the 45° direction and it is has been found that the need for high tear strength in a sewn seam is highest at the angle 45° to the direction of tear. Therefore such cross laminates are, for instance, very suited for sewn sacks and for sewn raincoats and other sewn products.

A particularly preferred composition in such laminates, or for the main layer in an individual ply of the laminate (or in the main layer of the ply if the ply consists of several coextruded sublayers) is formed of a blend of high molecular weight high density polyethylene with significantly lower molecular weight low density polyethylene. The latter preferably is selected from copolymers and/or branched polyethylenes which have the same or higher elongation of break (tested at room temperature under slow stretching) as the high molecular weight polyethylene and which are capable of distinctly segregating, while forming a distinct microphase, from the high molecular weight polyethylene on cooling of a molten homogeneous blend of the components. The blending ratio of the polyethylenes is preferably 25:75 to 75:25. The inclusion of polypropylene having significantly lower molecular weight than high molecular weight polyethylene can also be advantageous, in amounts of from 0 to 70% based on the combined weight of polypropylene and both polyethylenes. The high molecular weight high density polyethylene preferably has a melt flow index of 0.2 or lower by ASTM D1238 condition E and the low density polyethylene is preferably linear low density polyethylene.

The invention will now be explained in more detail with reference to the schematic drawings in which:

FIG. 1 is a horizontal view from above of apparatus for spiral cutting with a rotating unwind unit, in which the axis of the reel which is being unwound is perpendicular to the axis of the inflated tube. The rotating unwind unit is supported with bearings at one end only.

Figure 2:
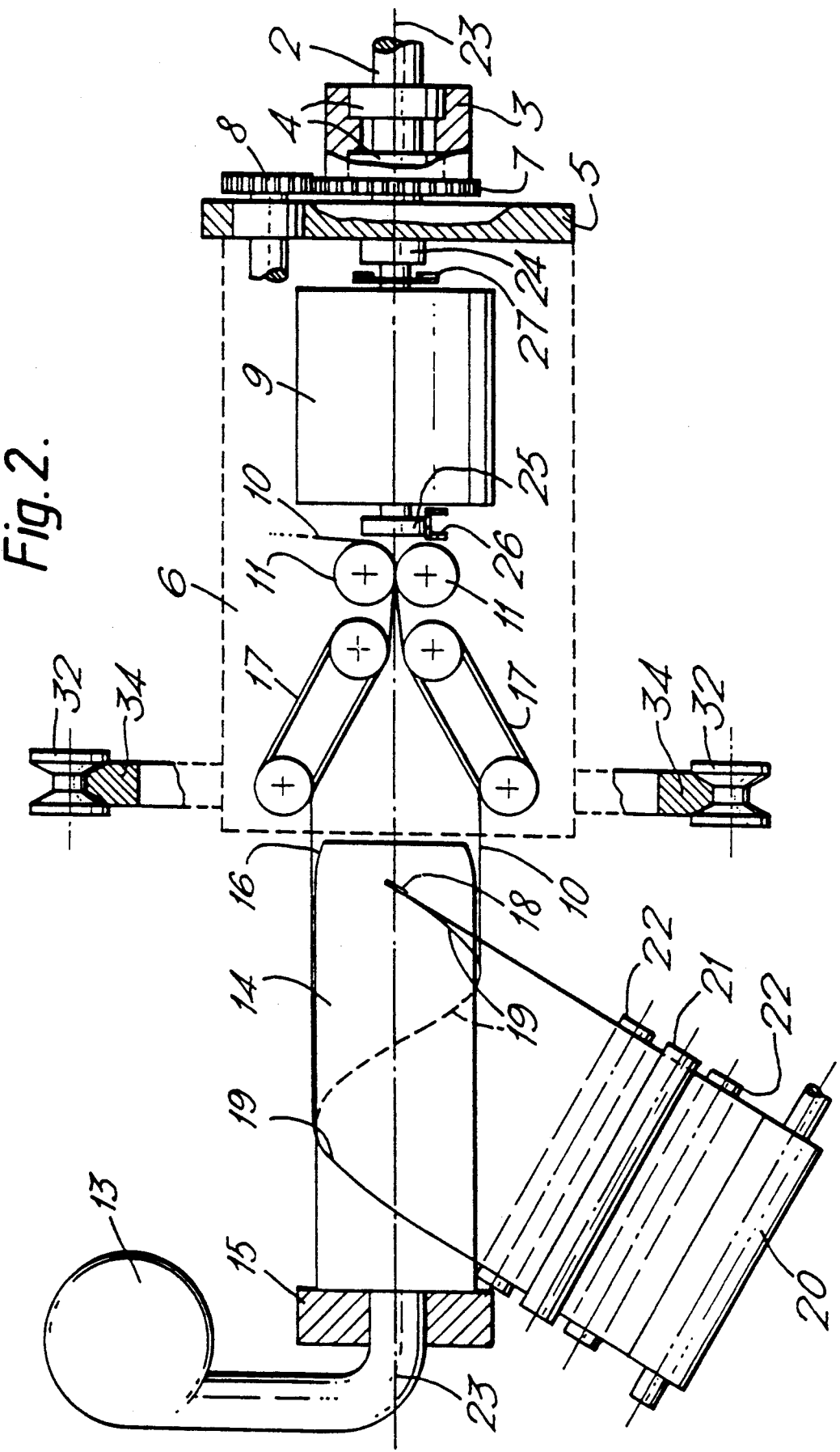

FIG. 2 is a similar view showing a different unwind unit in which the axis of the reel which is unwound is essentially coinciding with the axis of the inflated tube, and the flat tube is guided over one end of this reel. The drawings also show a particularly suitable giant roller bearing surrounding the tubular sheet. The guide system for taking the sheet off the reel is not shown.

Figure 3:
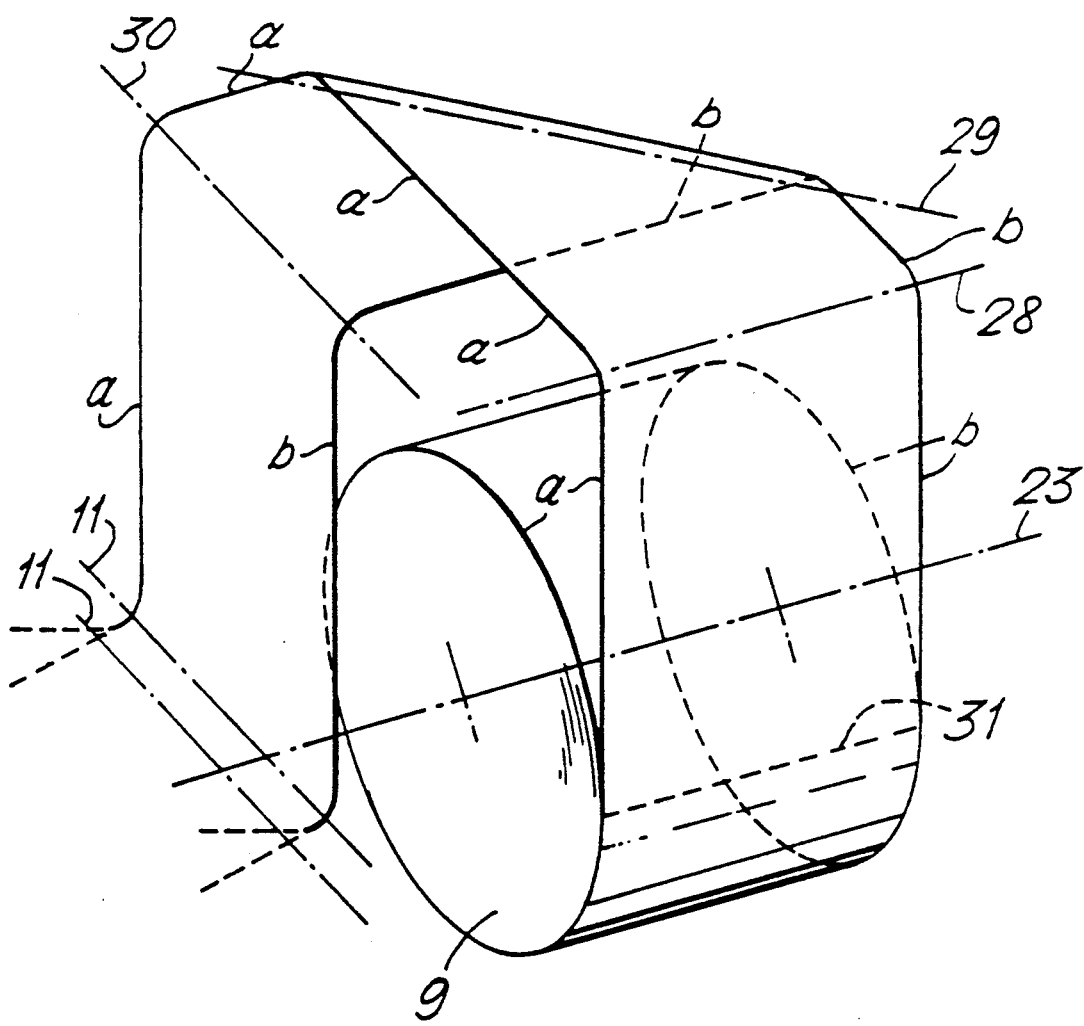

FIG. 3 is a perspective view of the guide system that is omitted from FIG. 2. Rollers are shown only as dotted lines indicating their axes.

The apparatus of FIG. 1 includes an unwind unit 1 which has a shaft 2 at one end and rotates around the axis of the shaft supported by a column 3 through heavy roller bearings 4. The column 3 is mounted on the floor of the room. For simplicity the unwind unit 1 is shown as having a housing consisting of an end plate 5 and two side plates 6. The drawing shows the unit at the time of rotation when these side plates are in a horizontal position and only the upper plate, indicated by dotted lines, can be seen. In practice a framework mainly of profile steel may be preferable to plates since it will be lighter and more convenient.

The support column 3 carries a fixed gear wheel 7 which is, engaged with another gear wheel 8 mounted on the end plate 5 and therefore carries a planetary movement. The wheel 8 supplies the drive to the various rollers and wheels in the unit 1, but for simplicity the transmission for these movements is not shown.

A reel 9 of flat tubular sheet 10 is mounted through bearings in the side plate and is supplied with a brake, the bearings and brake not being shown. The flat sheet 10 is taken off the reel 9 by means of a set of nip rollers 11 that define the first position in the process. The transmissions between the gear 8 and the rollers 11 determines the cutting angle. Preferably the gear ratios are made variable, for instance by providing the possibility of changing gear wheel.

There is a cylindrical cutting mandrel 14 and an air jet to inflate the sheet 10 is blown by a fan 13, such as a centrifugal fan, through the mandrel towards the first position. The mandrel is mounted on the floor through a column 15 and makes a relatively tight fit with the tubular sheet 10 which slides over it. The air will escape through the narrow space between the mandrel and the sheet and with produce some lubrication effect. The tip 16, of the mandrel may be rounded to avoid hang-up of the sheet.

The lubrication effect can be improved by corrugating the surface of the mandrel. The corrugations are preferably a circular array of ribs. They may be arranged only on one side of the mandrel, namely the one which is opposite to the direction of pull, or may be deepest on this side, since this is where the tensions are highest.

It will be seen that the axis of the inflated tube (23) coincides at least substantially with the axis of notation of the unwind unit 1.

In order to achieve a smooth screw movement of the inflated tubular sheet, it is very advantageous (and may even be necessary if the sheet is wide) to provide a driven support from the first position to a position at which the tube is inflated. Appropriate support for the inflating tube may be a pair of belts, and as shown in FIG. 1 there are two pairs of driven belts 17 which support the tube against the backwardly directed force of the air emerging from the mandrel 14 towards the first position, and promotes a smooth change in shape of the tube from the flat shape to the cylindrical shape. The belts are driven at generally the same velocity as that of the sheet, or at a higher velocity. Instead of using two arrays of belts, a pair of single belts, or two arrays of rollers having a relatively small diameter (only the last roller needing to be driven) could be used. For a relatively narrow flat sheet, one pair of driven barrel-like rollers of a large diameter may be sufficient.

The tubular sheet is cut by a simple knife or blade on a support 18 which conveniently can be fixed to the mandrel at an adjustable angle. The edge 19 that is shown on the drawing left of the knife, which becomes the right edge of the final sheet, moves first downwards and underneath the cutting mandrel.

The cut sheet is pulled by a driven winding unit 20 that is shown diagrammatically. The angle of cut, as mentioned, is determined by the ratio between the speeds of rotation of the unit 1 and the rolls 11, but the direction of the knife or blade and of the pull exerted by the unit 20 must also be adjusted so that they approximately fit with the rotation-determined cutting angle. The winding unit 20 includes a dancer roller 21 and two auxiliary idle rollers 22 to control the speed of the winder 20 and thereby set up a convenient tension.

By appropriate adjustment of the air pressure inside the tube (relative to the ambient air pressure around the tube) high tensions can be applied by the unit 20 (except in the case of very fragile sheets, when lower tensions must be used). Thus, when cutting a flat sheet of about 100 micron gauge and 1 m wide, tensions of from 5 to 20 kg/m final width are normally applicable.

It should be understood that the support for the rotating unwind unit, i.e., shaft 2 in bearing 4 in column 3, is only an example of support systems. For carrying heavier weights, this support can conviently be supplemented or substituted by one or more big steel rings, which surround and form part of the rotating unwind unit, and which stand and roll on a number of support rollers or support wheels and so serve as bearing rings. Alternatively, the support fixed to the floor may form part of one or more bearing rings, on which stand and roll one or more circular arrays of rollers or wheels, which surround and are mounted on the rotating unwind unit.

As a further modification of the machinery shown, the gear wheel, 7, instead of being fixed to column 3, may be rotatable and driven by a separate motor which is electronically regulated in relation to the motor for rotation of the entire unwind unit so as to provide for an easy adjustment of cutting angles.

While the drawing shows the unwind unit being rotated and the knife as well as the rewind unit being stationary, the opposite is also possible, namely a stationary unwind unit, while the knife together with the rewind unit rotating around the axis of the inflated tubular sheet. Although this last mentioned system is practical for relatively narrow sheets, it is less satisfactory for wide sheets.

In FIGS. 2 and 3, reel 9 has its axis substantially coinciding with the axis of the inflated tube and thus also with the axis of rotation of the unwind unit 1. The shaft of the reel is supported by a bearing 24 which is fixed to the end plate 5 and bearing 25 which is fixed to a beam 26, shown in cross section. This beam connects the two side plates 6. The bearings 24 and 25 can be opened for exchange of reels by means not shown. An adjustable brake 27 for the unwind is shown schematically.

In order to facilitate the understanding of FIG. 3, the edges of the flat tube are marked a and b, respectively, at different stations of their path.

The unwound flat sheet is guided by idle roller 28, sheet-turner bar 29 which can be a fixed roller, idle roller 30 and the set of driven nip rollers 11 which are similar to item 11 in FIG. 1. The above-mentioned rollers and bar or their bearings are fixed directly or through beams (not shown) to the side or end plates 6 and 5 of the unwind unit 1. The flat sheet is pulled off the reel at discharge zone 31 and the entire sheet guide system and the discharge zone 31 will spin around the axis 23.

The rest of the spiral cutting machine can be constructed similarly to FIG. 1 except that in FIG. 2 a large roller bearing 34 is shown. This is shown as the cross section of a big ring fixed to the side plates 6 (the connection is indicated by dotted lines) and two support reels or rollers 32 which are fixed to a support (not shown) through bearings. The two rollers as shown can only support the rotating unwind unit in respect of sideways movements and there must of course also be one or preferably several such wheels to hold the weight of the unit. Preferably there is a circular array of such wheels or rollers.

The direction of rotation of reel 9 relative to the housing or frame of the unwind unit 1 should preferably, but not necessarily, be opposite to the direction of rotation of the housing. This will make the absolute rotation of reel 9 as small as possible.

Dependent on the cutting angle v and the flat width of the tube h there will be a momentary radius of the reel $$\left( r = \frac{h}{\pi \cdot tg\ v} \right)$$

for which the absolute velocity of rotation of reel 9 is zero even though the housing of the unwind unit (and with this the discharge zone 31) may spin around the axis 23 at high velocity. The weight of rotating machine parts is therefore an essential limiting factor for the capacity of the spiral cutter even more in this embodiment than it is in the embodiment of FIG. 1. Instead of the unwind unit based on end wall 5 and side wall 6, it is therefore particularly desirable to use a lightweight framework of which the ring 31 and possibly a similar ring at the other end are integral parts.

In order to guide and turn the flat tube in the desired manner, the bar or fixed roller 29 must form an angle close to 45° to the axis 23. This angle is preferably made automatically adjustable over a narrow range of angles and adjusted by the unput of a sensor which senses the position of one of the edges. In this manner the middle of the sheet 10 is controlled to reach the axis of rotation 23 even when the reel 9 is not cleaning wound or has been put in a slightly wrong position on the shaft.

When the rotation of the unwind unit is very fast, as is normally intended, the guiding of the sheet shown in FIG. 3 may be brought out of order by air turbulence. In order to overcome this, a wind shield or hood (preferably transparent) may be provided around the entire rotating unwind unit 1, fixed to and rotating with the latler.

When the knife is at a constant location and the tubular sheet is carried away from the reel along the axial direction of the latter, while the zone 31 is spinning around the reel, a guide system similar to FIG. 3 is preferable but not essential. Especially when the cutting angle is relatively small, e.g., about 30°, the sheet may be allowed to wrinkle and even to compact to tow-form, since subsequent inflation by air can bring it back to tube-form. However support belts 17 will normally not be sufficient in such cases and should preferably be substituted by a circular array of many narrow belts. At the exit of the support system, the diameter of this array should be close to that of the tubular sheet. The optimum diameter of the array at the inlet to the support zone, and the necessary length of the zone, can be established by simple experiments.

Provided the array of support belts rotates around the axis of the array with exactly the same rotational velocity as the velocity by which the discharge zone 31 spins around the reel, it is not absolutely necessary for nip rollers 11 to follow this rotation. If they do not, the tubular sheet may become compacted and twisted in front of rollers 11 but will untwist and open when it moves away from the rollers.

As shown, the reel 9 is held from the inside and the tube is drawn off the outside but the reel 9 may alternatively be held from the outside with the unwind taking place from the inside.

Although the apparatus shown in FIGS. 2 and 3 does incorporate a supply of air through the mandrel 14, the features of these systems are also valuable even when the air supply is omitted. Thus the rotating unwinding system shown in FIGS. 2 and 3, and similar unwind systems in which tubular sheet is carried away over one end of the reel while the zone of discharge spins, is of general value for spiral cutting of materials from heavy reels and can be practiced independent of the use of the mandrel and air supply shown in FIG. 1. Likewise the achievement of spiral formed orientation by relative rotations between extrusion die and take-off means, combined with spiral cutting which makes the angle of orientation bigger, also can be utilised independent of air inflation from the cutting mandrel.

Apparatus constructed for use in the defined processes is new and forms a further aspect of the invention.

EXAMPLE

Helical cutting under about 30° of a 100 micron tubular low density polyethylene sheet of lay-flat width 2080 mm, taking from a 200 kg reel.

In principle the apparatus is constructed as shown in FIG. 1. However, the housing for the unwind unit is substituted by a more lightweight frame construction, and the main bearing to support this unit is a big steel ring surrounding the unit forming part of the frame, and the bearing is nested in a circular array of rollers.

The control of cutting angle is electronical as explained at the end of the description of FIG. 1. The external diameter of the mandrel, including an array of thin ribs on the surface, is 1300 mm, while the flat width 2080 mm corresponds to a diameter of 1324 mm, i.e., the different between the radii of the tubular sheet and the mandrel is 12 mm. The final width of the sheet is 3600 mm, the take-up velocity 60 m per minute.

The air jet is established by a centrifugal fan, full yield of which is 2000 m$^3$ per hour, which is judged to have worked at about half of about full yield, that is about 1000 m$^3$ per hour. According to the data for the fan this corresponds to 600 mmH$_2$O overpressure. (This is a reliable although rough indication since the pressure does not very significantly depend on air flow.)

The machinery works very reliably and the helical cut is straight.

I claim:

1. In a method of helically cutting a flexible tubular film of substantially predetermined diameter into a flat strip in which said tubular film is supplied in flattened form from a supply source to a first position, advanced at a substantially predetermined velocity from said first position to an expansion zone where it is expanded from said flat form into generally cylindrical tubular form, passed over a hollow cylindrical mandrel disposed within said cylindrical tubular form axially of said mandrel, and while on said mandrel helically cut into a flat strip, and said flat strip is removed from the mandrel at an angle to the mandrel axis, the improvement wherein said mandrel is hollow with an external diameter sightly less than the diameter of the expanded tubular film, and comprising the steps of expanding said flattened tubular form in said expansion zone by inflation with air continuously supplied through said hollow mandrel in the direction of said first position under a pressure such as to spread said flattened tubular film into a stiff cylindrical tube that makes a sliding fit with said mandrel and resists deformation during the helical cutting, and positively controlling the advance and expansion of the flattened tube in said expansion zone by means of moving surfaces defining a diverging expansion zone while driving said moving surfaces at a velocity at least substantially as great as the predetermined velocity of advance of said film from said first position to said expansion zone.

2. A method according to claim 1 in which the air pressure within the inflated tube is sufficient to impart to the inflated tube a stiffness sufficient to withstand a tension of at least 0.2 kg/m width of the helically cut flat strip being removed at said angle from the mandrel.

3. A method according to claim 1 in which the driven support surfaces comprise belts.

4. A method according to claim 1 in which the surface of the mandrel is corrugated, in a longitudinal direction, to minimise friction between the sheet and mandrel.

5. A method according to claim 1 in which the film is formed of a polymer material and at least prior to said helical cutting, the tubular film has been longitudinally oriented below the melt range of the polymer material.

6. The method of claim 1 wherein the diameter of said mandrel is adjustable and including the step of adjusting the mandrel diameter while the inflated tubular film is passing axially over said mandrel.

7. The method of claim 6 including the step of adjusting the diameter of said mandrel in response to changes in the rate of air flow or the pressure of the air inflating the tube.

8. The method of claim 1 in which the expanded tubular film while on the mandrel is cut at a cutting zone that has a fixed location relative to the mandrel axis while the flattened tubular film in said first position and said driven supporting surfaces are rotated together bodily in unison around the mandrel axis so that the expanded tubular film advances axially along the mandrel while simultaneously undergoing helical rotation, and wherein the film supply source is in the form of a reel of said flattened film upstream of said first position, said reel being rotatable about its longitudinal axis and said longitudinal axis is fixed and generally coaxial with the axis of said mandrel, and the flattened film is advanced to said first position substantially axially of the reel.

9. The method of claim 8 wherein the film is withdrawn from the supply reel through an unwinding zone spaced from the reel periphery, and said unwinding zone is translated around the reel periphery in synchronism with the rotation in unison of the film in said first position and said driven supporting surfaces to cause unwinding of the flattened film generally tangentially from the reel while the reel rotates around said fixed axis.

10. The method of claim 9 wherein the flattened film in passing through said unwinding zone is guided through substantially a 90° change in direction while being maintained generally parallel to the reel axis and then along a path inclined to the reel axis bringing the center line of the flattened film into substantial coincidence with the common axis of said mandrel and said reel.

11. The method of claim 1 in which the tubular film while on the mandrel is cut at a cutting zone that has a fixed location relative to the mandrel axis and wherein the flattened tubular film supply source is in the form of a reel of said film which is rotatable about its axis and is arranged with its axis generally perpendicular to the mandrel axis with the mid-point of its axis 12. The method of claim 5 wherein the angle of said helical cutting is such that the direction of said melt orientation is oblique to the length of the flat strip whereby the flat strip is adapted to be laminated with at least one other similar flat strip with the orientation directions of such flat strips criss-crossing to form a composite laminated sheet exhibiting increased resistance to tearing.

13. In a method of helically cutting a flexible tubular film into a flat strip in which said tubular film is supplied from a supply source to a first position in a flattened tubular form, advanced from said first position to an expansion zone where it is expanded from said flattened form into generally cylindrical tubular form, passed over an elongated mandrel axially thereof, and while on said mandrel helically cut into a flat strip, and said flat strip is removed from the mandrel, the improvement in which the expanded tubular film is cut in a cutting zone that has a fixed location relative to the mandrel axis, and wherein the film supply source is in the form of a reel of said film upstream of said first position, said reel being rotatable about its longitudinal axis with said axis being fixed and generally coaxial with the axis of said mandrel, and comprising the steps of withdrawing the film from the reel periphery and then advancing the film from said reel to said first position substantially axially of the reel.

14. The method of claim 13 wherein said film is withdrawn from the periphery of the supply reel in an unwinding zone spaced from the reel periphery, and the unwinding zone is translated around the reel periphery to cause unwinding of the flattened film generally tangentially of the reel while the reel rotates about its fixed axis.

15. The method of claim 14 wherein the flattened film in passing through said unwinding zone is guided through substantially a 90° change in direction while maintained generally parallel to the reel axis and then along a path bringing the center line of the flattened film into substantially coincidence with the axis of said mandrel while the flattened film is maintained at an inclination to said reel axis.

* * * * *

UNITED STATES PATENT AND TRADEMARK OFFICE
CERTIFICATE OF CORRECTION

PATENT NO. : 5,248,366
DATED : September 28, 1993
INVENTOR(S) : OLE-BENDT RASMUSSEN It is certified that error appears in the above-identified patent and that said Letters Patent is hereby corrected as shown below:

In Col. 12, line 2, after "axis", insert the following:

--intersecting the mandrel axis, and the reel together with said first position and supporting surfaces form an unwinding unit that rotates as a unit about the mandrel axis.--

Signed and Sealed this

Eighth Day of March, 1994

Attest:

BRUCE LEHMAN

Attesting Officer  Commissioner of Patents and Trademarks